US011710502B1

(12) United States Patent
Lee et al.

(10) Patent No.: US 11,710,502 B1
(45) Date of Patent: Jul. 25, 2023

(54) HEAT-ASSISTED MAGNETIC RECORDING HEAD WITH A MULTILAYER PLASMONIC DISK

(71) Applicant: Seagate Technology LLC, Fremont, CA (US)

(72) Inventors: Tae-Woo Lee, Eden Prairie, MN (US); Derek Leventry, Eden Prairie, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/653,016

(22) Filed: Mar. 1, 2022

(51) Int. Cl.
*G11B 5/00* (2006.01)
*G11B 5/31* (2006.01)
*G11B 13/08* (2006.01)
*G11B 5/48* (2006.01)
*G11B 5/60* (2006.01)

(52) U.S. Cl.
CPC ............ *G11B 5/314* (2013.01); *G11B 5/4866* (2013.01); *G11B 5/6088* (2013.01); *G11B 13/08* (2013.01); *G11B 2005/0021* (2013.01)

(58) Field of Classification Search
CPC ..... G11B 5/00; G11B 5/314; G11B 11/19633; G11B 11/19688; G11B 4/54; G11B 5/6082; G11B 5/6088; G11B 5/3912; G11B 2005/0021
USPC ........................................................... 360/59
See application file for complete search history.

(56) References Cited

U.S. PATENT DOCUMENTS 8,130,599 B2 3/2012 Komura et al.
8,169,731 B2 5/2012 Mizuno et al.
8,208,349 B2 6/2012 Tanaka et al.
8,243,559 B2 8/2012 Komura et al.
8,325,567 B2 12/2012 Miyauchi et al.
8,437,230 B2 5/2013 Aoki et al.
8,934,198 B2 1/2015 Zou et al.
9,153,267 B1 10/2015 Komura et al.
9,251,837 B2 2/2016 Zhu et al.
9,620,151 B1 4/2017 Shimazawa et al.
9,626,991 B2 4/2017 Chen et al.
9,728,209 B2 8/2017 Chen et al.
9,799,352 B1 10/2017 Chen et al.
10,043,542 B2 8/2018 Shimazawa et al.
10,062,401 B1 8/2018 Zhao et al.
10,229,704 B2 3/2019 Blaber et al.
10,311,906 B2 6/2019 Blaber et al.
10,490,214 B1 11/2019 Chen
10,490,221 B1 11/2019 Chen
10,586,560 B1 3/2020 Wang et al.
10,636,440 B2 4/2020 Cheng et al.
10,699,732 B2 6/2020 Cheng et al.
(Continued)

FOREIGN PATENT DOCUMENTS

WO 2016/191707 A1 12/2016

*Primary Examiner* — Nabil Z Hindi

(57) ABSTRACT

A heat-assisted magnetic recording head includes a waveguide and a near-field transducer. The near-field transducer includes a plasmonic disk disposed proximal to the waveguide. The plasmonic disk includes a first plasmonic layer, a second plasmonic layer, and a middle layer. The first plasmonic layer is coupled to the waveguide. The second plasmonic layer is disposed distal to the waveguide relative to the first plasmonic layer. The middle layer is disposed between the first plasmonic layer and the second plasmonic layer.

19 Claims, 7 Drawing Sheets

(56) References Cited

U.S. PATENT DOCUMENTS

| | | | | |
|---|---|---|---|---|
| 10,916,262 | B1 | 2/2021 | Janjua et al. | |
| 11,380,354 | B2 * | 7/2022 | Peng ...................... | G11B 5/314 |
| 2021/0027808 | A1 | 1/2021 | Matsumoto et al. | |
| 2021/0027809 | A1 | 1/2021 | Habibi et al. | |

* cited by examiner

HEAT-ASSISTED MAGNETIC RECORDING HEAD WITH A MULTILAYER PLASMONIC DISK

TECHNICAL FIELD

The disclosure relates to a near-field transducer for a heat-assisted magnetic recording head of a hard disk drive.

BACKGROUND

Some hard disk drives (HDDs) utilize heat-assisted magnetic recording (HAMR) to increase the areal density of the HDD. A recording head of a HAMR HDD typically includes a laser, a near-field transducer (NFT) configured to briefly heat a small hot spot on a surface of a magnetic disk of the HDD, and a write pole configured to write data to the magnetic disk in the vicinity of the hot spot. The process of generating and condensing localized surface plasmons (LSPs) on the NFT to produce the hot spot generates enormous amounts of heat which may degrade and/or deform various components of the NFT, thus potentially reducing the performance and/or life expectancy of the HAMR head and the HDD.

SUMMARY

The present disclosure describes a heat-assisted magnetic recording (HAMR) head having a near-field transducer (NFT) that includes a near-field emitter and a plasmonic disk. The plasmonic disk has multiple plasmonic layers that are separated by a middle layer of a thermally robust metal (e.g., iridium, rhodium). The plasmonic layers include one or more plasmonic metals (e.g., gold). Separating plasmonic layers of the plasmonic disk with a layer of a thermally robust metal may, in some examples, reduce thermally related defect modes of the plasmonic disk, such as disk recession, voiding, diffusion of plasmonic metals, migration of plasmonic metals from the plasmonic layers, and/or other defects related to densification of plasmonic metals under thermal exposure.

In one example, a HAMR head includes a waveguide; and a near-field transducer including a plasmonic disk disposed proximal to the waveguide, the plasmonic disk including a first plasmonic layer coupled to the waveguide; a second plasmonic layer disposed distal to the waveguide relative to the first plasmonic layer; and a middle layer disposed between the first plasmonic layer and the second plasmonic layer.

These and other features and aspects of various examples may be understood in view of the following detailed discussion and accompanying drawings.

DETAILED DESCRIPTION

Figure 1:
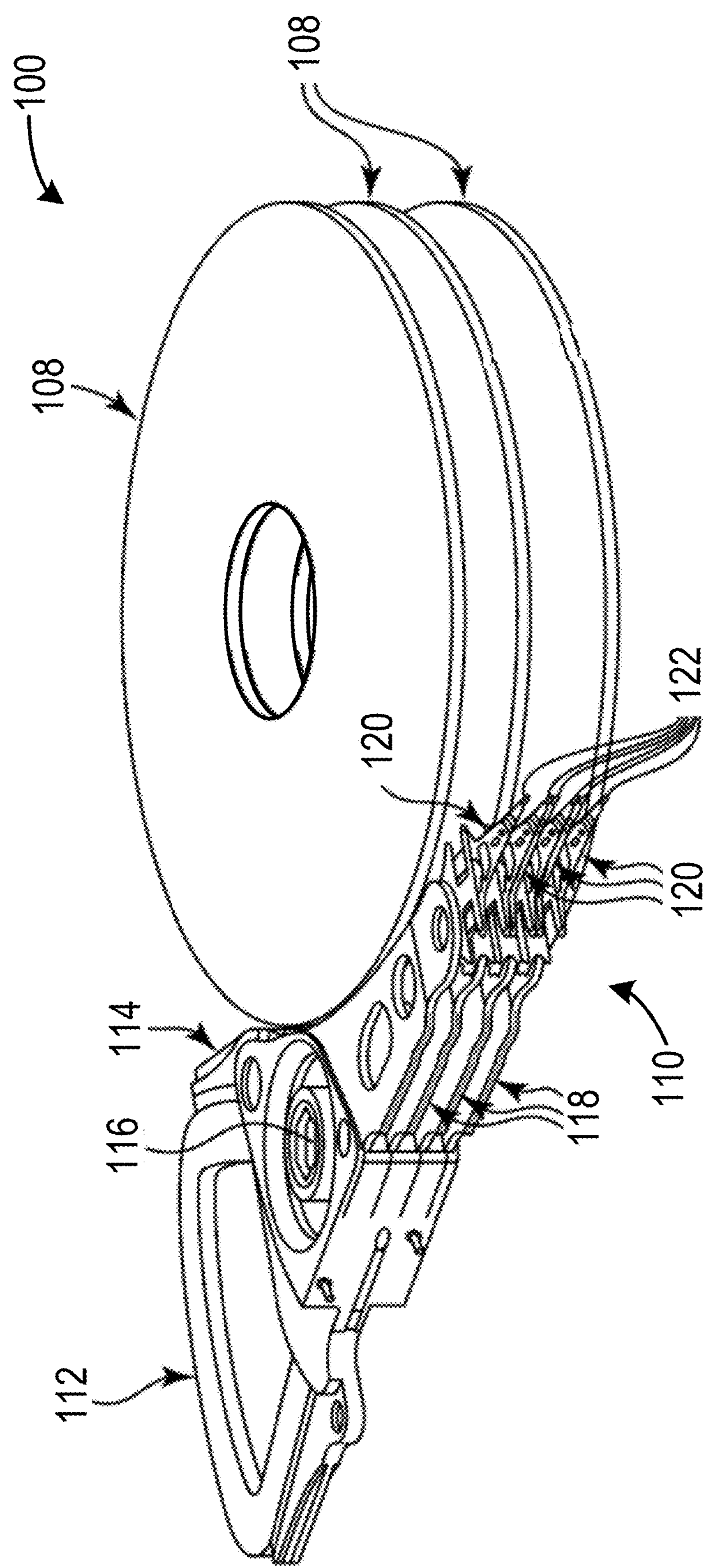
FIG. 1 is a perspective view of an example hard disk drive, in accordance with aspects of this disclosure.

FIG. 1 is a perspective view of an example heat-assisted magnetic recording (HAMR) hard disk drive (HDD), in accordance with aspects of this disclosure. HDD 100 includes a head stack assembly (HSA) 110 and one or more magnetic disks 108. HSA 110 includes a plurality of head gimbal assemblies (HGA) 120. Each HGA 120 includes a slider 122. HSA 110 of FIG. 1 includes a voice coil drive actuator 112. Voice coil drive actuator 112 produces a magnetic field which exerts a force on an actuator mechanism 114, causing actuator mechanism 114 to rotate about a shaft 116 in either rotational direction. Rotatable drive actuator arms 118 are mechanically coupled to actuator mechanism 114 and to each HGA 120 such that rotating actuator mechanism 114 causes rotatable drive actuator arms 118 and HGAs 120, and thus sliders 122, to move relative to magnetic disks 108.

Figure 2:
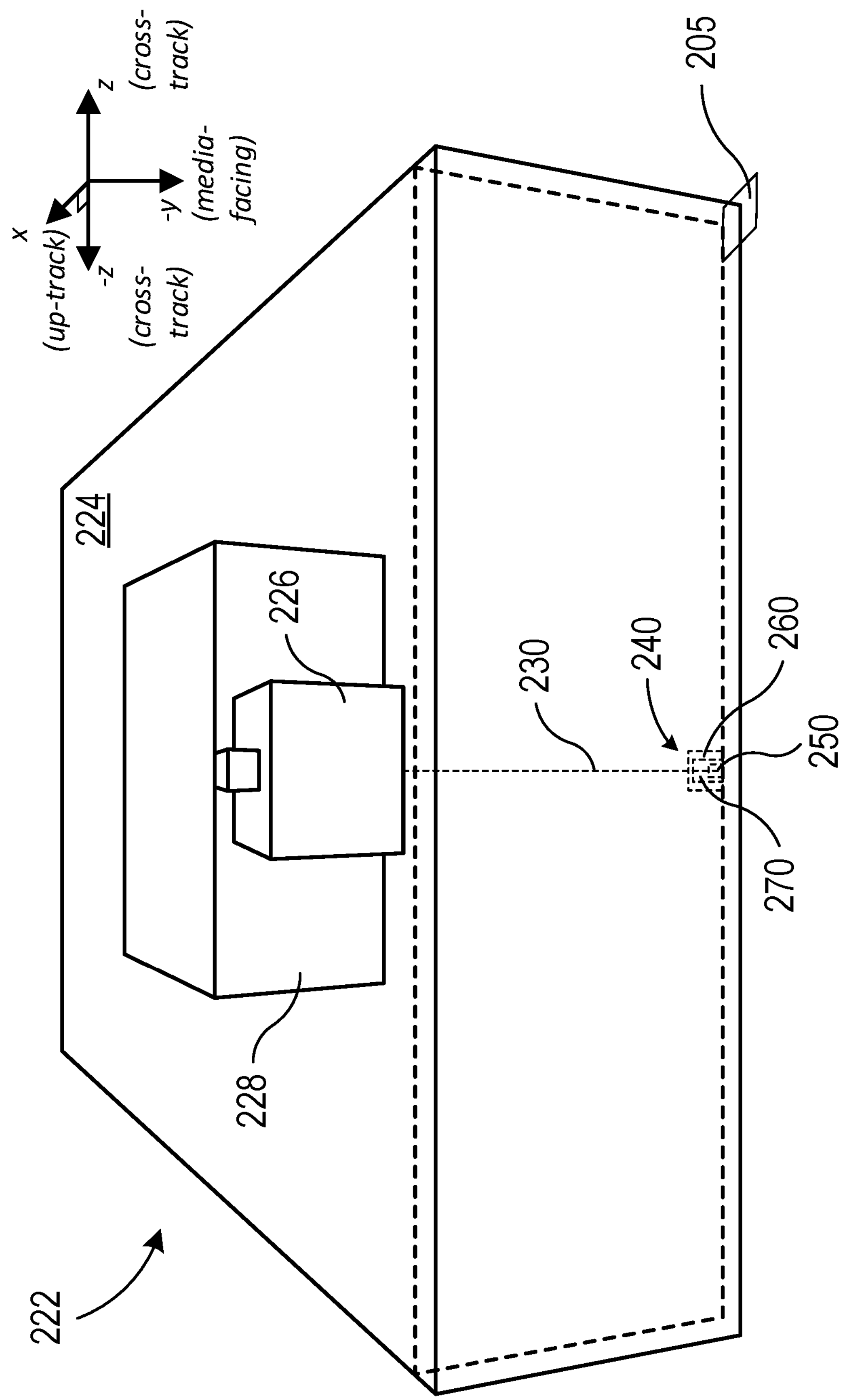
FIG. 2 is a perspective view of an example slider, in accordance with aspects of this disclosure.

FIG. 2 is a perspective view of an example slider 222, in accordance with aspects of this disclosure. Slider 222 is an example of slider 122 of FIG. 1. In the example of FIG. 2, slider 222 includes a slider body 224, a laser 226, a submount 228, and a HAMR head 240.

HAMR head 240 is configured to read data from and write data to a surface of a magnetic disk. HAMR head 240 includes a waveguide 230, a near-field transducer (NFT) 250, a writer 260, and a reader 270. In the example of FIG. 2, some features or parts of features of NFT 250, writer 260, and/or reader 270 are presented on a media-facing surface that is positioned over a surface of a magnetic disk during some operations of the HDD (e.g., write operations, read operations). In some examples, media-facing surface 205 is an air-bearing surface (ABS) that is configured to HAMR head 240 at a target spacing (e.g., a head-media spacing) from a surface of the magnetic disk during some operations of HDD 100. During such operations, media-facing surface 205 faces and is held proximate to the moving surface of the magnetic disk by a cushion of gas, known as an active air bearing (AAB), that is produced from a dynamic flow of gas across a pattern of recessed sub-surfaces bound within the volume of slider body 224 by media-facing surface 205.

Laser 226 is configured to emit photons of a target wavelength. In some examples, laser 226 emits photons with a wavelength in the near infrared range (e.g., approximately 830 nm) or visible range. Examples of laser 226 include an optically pumped semiconductor laser, a quantum well laser, an integrated laser, or other suitable laser. Laser 226 of this example may be configured as an edge emitting laser (EEL), vertical cavity surface emitting laser (VCSEL), or other type of laser. Other example HAMR heads may include other types of light sources such as light emitting diodes (LEDs) or surface emitting diodes.

In one example, laser 226 is coupled to slider body 224 via submount 228. In some examples, laser 226 may be directly mounted to the slider body 224. In some example HAMR sliders, a laser may be integrated into a slider body (e.g., on-wafer laser). In the example of FIG. 2, laser 226 and submount 228 are located on a face of slider body 224 which is opposite to media-facing surface 205. Submount 228 may be configured to redirect photons output from laser 226 so that the photons are directed into waveguide 230 in the negative y-direction of FIG. 2 (e.g., toward NFT 250 in the media-facing direction). The path between laser 226 and waveguide 230 may include one or more optical couplers, mode converters, and/or mode couplers. Waveguide 230 is formed integrally within slider body 224 and is configured to deliver photons from laser 226 to NFT 250.

NFT 250 is configured to create a small hot spot on a magnetic disk. For example, NFT may generate and support a distribution of localized surface plasmons (LSP) upon receiving incident photons from laser 226 by way of waveguide 230 and may condense the LSP distribution on an area or feature of NFT 250. NFT 250 amplifies a near-field of the condensed LSP distribution and focuses the near-field toward a surface of a magnetic disk (e.g., a magnetic disk 108 of FIG. 1) to produce a hot spot. Writer 260 is configured to generate a magnetic field from an electrical current and direct the magnetic field at the hot spot on the magnetic disk. The near-field energy heats and lowers the coercivity of the magnetic grains in the hot spot, thereby enabling these magnetic grains to be oriented by the magnetic field generated by writer 260. Turning off laser 226 or moving NFT 250 toward a different location of the magnetic disk (or moving the magnetic disk such that NFT 250 faces a different location of the magnetic disk) removes the focused near-field energy from the hot spot. Removing the near-field energy allows the magnetic grains contained in the spot to cool. The cooling locks in the grain orientation induced by the magnetic field generated by writer 260, thus preserving the bits of written data.

Figure 3:
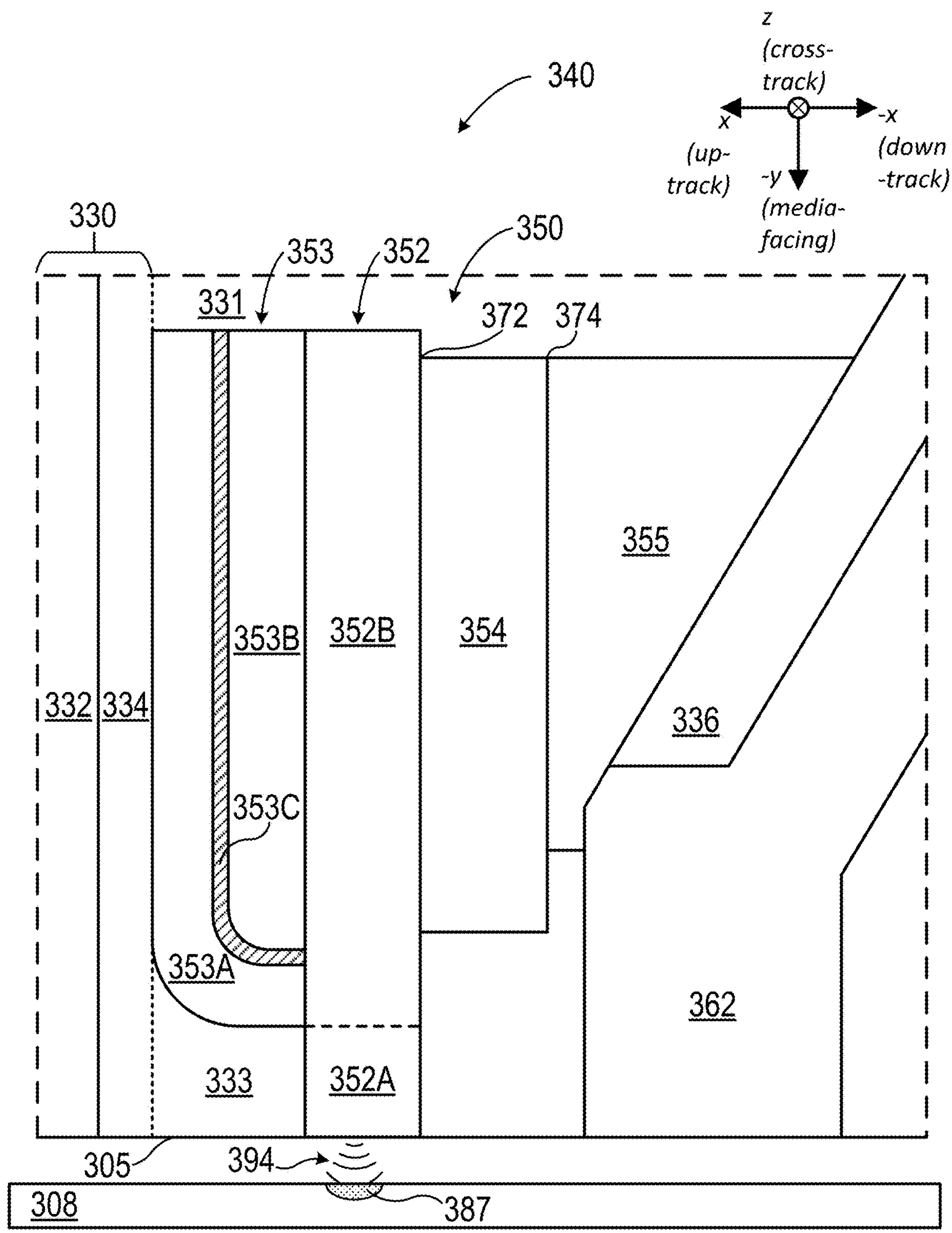
FIG. 3 is a cross-sectional view of an example HAMR head, in accordance with aspects of this disclosure.

FIG. 3 is a cross-sectional view of an example HAMR head, in accordance with aspects of this disclosure. HAMR head 340 includes a waveguide 330, an NFT 350, a write pole 362, a heat sink 355, and a diffuser 336. NFT 350 includes a plasmonic disk 353 and a near-field emitter 352. In the example of FIG. 3, NFT 350 includes a middle disk 354.

Waveguide 330 is disposed in an up-track direction relative to plasmonic disk 353, near-field emitter 352, and middle disk 354. Waveguide 330 is configured to support LSP generation on NFT 350 by directing photons from a light source (e.g., laser 226 of FIG. 2) toward NFT 350. In some examples, waveguide 330 includes multiple optical layers that are configured to support the generation of LSPs. Waveguide 330, for example, may include a waveguide core 332 and a core-to-NFT spacing (CNS) layer 334. CNS layer 334 may be part of a cladding structure that also includes a rear cladding layer 331 and/or a front cladding layer 333. Rear cladding layer 331 is disposed behind plasmonic disk 353 relative to a media-facing surface 305 of HAMR head 340. Front cladding layer 333 is disposed proximal to media-facing surface 305 and in front of plasmonic disk 353 relative to media-facing surface 305.

In some examples, waveguide core 332 includes a dielectric material (e.g., niobium oxide, tantalum oxide) and CNS layer 334 includes a different dielectric material (e.g., aluminum oxide, silicon dioxide). In one example, the refractive index of core 332 is different than the refractive index of CNS layer 334. Waveguide 330 may, in some scenarios, manipulate a momentum component of an incident photon from the light source and match the momentum component of the incident photon to a momentum component of a surface plasmon mode of NFT 350. In this way, photons directed by waveguide 330 toward NFT 350 may couple to free electrons of NFT 350 and excite one or more LSP resonance modes of NFT 350.

NFT 350 is configured to condense LSPs that are generated on NFT 350, amplify a near field of the LSPs, and emit a near-field 394 to produce a hot spot 387 on a magnetic disk 308. Near-field 394 and a magnetic field from write pole 362 are directed to be partially coincident on spot 387 such that the temperature increase resulting from near-field 394 reduces the magnetic coercivity of the grains within hot spot 387 and enables the magnetic field from write pole 362 to orient them more easily, thus producing more stable bits of written data upon cooling.

Near-field emitter 352 is disposed in a down-track direction relative to plasmonic disk 353. Near-field emitter 352 is configured to emit near-field 394 to produce hot spot 387 on magnetic disk 308. Near-field emitter 352 includes a peg 352A and an anchor disk 352B. Peg 352A is disposed proximal to media-facing surface 305. In some instances, one or more portions of peg 352A are exposed on media-facing surface 305. Peg 352A is configured to receive and amplify a near-field of the distribution of LSPs and emit near-field 394 to produce hot spot 387 on magnetic disk 308.

Anchor disk 352B is disposed behind peg 352A relative to media-facing surface 305 (e.g., in the +y direction, opposite the−y media-facing direction). Anchor disk 352B is configured to support a distribution of LSPs. In some examples, anchor disk 352B is configured to participate in LSP generation. For example, peg 352A may generate hotspot 387 by receiving and condensing a distribution of LSPs from anchor disk 352B and/or other features, amplifying a near-field of the LSP distribution, and emitting amplified near-field 394 toward the surface of magnetic disk 308.

In some examples, near-field emitter 352 is a single, continuous feature comprising peg 352A and anchor disk 352B. That is, peg 352A and anchor disk 352B may be regions or features of a single piece. Near-field emitter 352 may, for example, be deposited during a single manufacturing level or step (e.g., a photolithography level, a metal deposition step), with the shape and dimensions of the peg 352A and anchor disk 352B defined by a lithography pattern. In these examples, near-field emitter 352 may taper or narrow toward peg 352A. Peg 352A may protrude from anchor disk 352B in the vicinity of media-facing surface 305. Peg 352A and anchor disk 352B may share common material(s) (e.g., peg 352A and anchor disk 352B may both include iridium). In some examples, peg 352A and anchor disk 352B include iridium, rhodium, ruthenium, gold alloy(s), gold composite(s) (e.g., a gold-nanoparticle composite), or combinations thereof.

Middle disk 354 is disposed in a down-track direction relative to near-field emitter 352. Middle disk 354 is coupled to anchor disk 352B. In some examples, middle disk 354 and anchor disk 352B are coupled to each other at an interface 372 that is substantially orthogonal to media-facing surface 305. Interface 372 includes a down-track surface of anchor disk 352B coupled to an up-track surface of middle disk 354. In some examples. middle disk 354 is configured to direct localized surface plasmons toward peg 352A of near-field emitter 352. In some examples, middle disk 354 is configured to mitigate background fields. In some examples, middle disk 354 includes at least one of gold, iridium, rhodium, copper, tantalum, tungsten, or ruthenium.

Heat sink 355 is disposed in a down-track direction relative to middle disk 354 and is coupled to middle disk 354. In some examples, heat sink 355 and middle disk 354 are coupled to each other at an interface 374 that is substantially orthogonal to media-facing surface 305. Interface 374 includes a down-track surface of middle disk 354 coupled to an up-track surface of heat sink 355. Heat sink 355 is configured to draw heat away from regions of NFT 350 and direct the heat toward other regions of HAMR head 340. In the example of HAMR head 340, heat sink 355 is coupled to diffuser 336, with diffuser 336 disposed in a down-track direction relative to heat sink 355. Diffuser 336 is a heat sink that is configured to draw heat from heat sink 355 and dissipate the heat toward other areas of the associated slider (e.g., toward other heat sinks of slider 222 of FIG. 2). In some examples, drawing heat away from regions of NFT 350 that are prone to thermal degradation may reduce defect formation in NFT 350 and/or extend the operating lifetime of HAMR head 340. Heat sink 355 and/or diffuser 336 may include a thermally conductive material (e.g., gold). In some examples, heat sink 355 includes rhodium, copper, tungsten, tantalum, iridium, platinum, ruthenium, nickel, iron, or combinations thereof.

Plasmonic disk 353 is disposed in an up-track direction relative to near-field emitter 352 and middle disk 354. Plasmonic disk 353 is configured to generate and support LSPs through resonance coupling of electrons with incident photons that are generated by a light source (e.g., laser 226 of FIG. 2) and are directed toward NFT 350 by waveguide 330.

In accordance with aspects of this disclosure, plasmonic disk 353 includes a first plasmonic layer 353A, a second plasmonic layer 353B disposed distal to waveguide 330 relative to first plasmonic layer 353A, and a middle layer 353C disposed between first plasmonic layer 353A and second plasmonic layer 353B. First plasmonic layer 353A includes an outer surface that is coupled to waveguide 330. The outer surface of first plasmonic layer may be further coupled to rear cladding layer 331 and/or front cladding layer 333. Plasmonic disk 353 includes a down-track surface that includes a down-track surface of second plasmonic layer 353B, a down-track surface of middle layer 353C, and a down-track surface of first plasmonic layer 353A. The down-track surface of plasmonic disk 353 is coupled to an up-track surface of anchor disk 352B.

Middle layer 353C includes a primary metal. As used herein the term "primary metal" refers to a metal that is present in a feature in an amount (e.g., atomic percent or weight percent) that is greater than any other metal that is also present in the same feature. In some examples, the primary metal of middle layer 353C is a thermally robust metal. As used herein, a thermally robust metal is a metal with a melting point of approximately 1900° C. or greater. Examples of thermally robust metals include iridium, rhodium, tantalum, tungsten, or ruthenium. In some examples, a thermally robust material has a melting point of at least approximately 2300° C. (e.g., iridium, ruthenium). Additional characteristics of thermally robust materials may include low oxidation rates at elevated temperatures and/or low diffusion rates (e.g., diffusion along interfaces between features of a HAMR head, bulk diffusion in materials such as gold). In some examples, the primary metal constitutes at least 50 atomic percent of middle layer 353C. For example, iridium may constitute at least 50 atomic percent of middle layer 353C. In some examples, the primary metal constitutes at least 90 atomic percent of middle layer 353C. In another example, the primary metal constitutes at least 95 atomic percent of middle layer 353C.

First plasmonic layer 353A and second plasmonic layer 353B each include a plasmonic metal. Plasmonic metals may possesses properties (e.g., electrical properties, optical properties) that promote resonance coupling between photons incident upon the plasmonic metal and free electrons of the plasmonic metal. Such resonant coupling of a photon with free electrons of the plasmonic metal may excite one or more plasmonic modes of the plasmonic metal, which may result in the generation of an LSP on a surface of the plasmonic metal. Plasmonic metals that demonstrate efficient plasmon generation in response to photons of a wavelength target or range (e.g., wavelengths from 800 nanometers to 900 nanometers) are said to have a high plasmonic figure of merit. Examples of plasmonic metals include gold, silver, ruthenium, copper, aluminum, and/or rhodium.

First plasmonic layer 353A and/or second plasmonic layer 353B may include an alloy and/or a composite of a plasmonic metal (e.g., a gold alloy, a gold/nanoparticle composite). In some examples, the plasmonic metal of first plasmonic layer 353A is a primary metal that is different than the primary metal of middle layer 353C. In one example, the primary metal of first plasmonic layer 353A constitutes at least 90 atomic percent of first plasmonic layer 353A. In some examples, the plasmonic metal of second plasmonic layer 353B is a primary metal that is different than the primary metal of middle layer 353C. In one example, the primary metal of second plasmonic layer 353B constitutes at least 90 atomic percent of second plasmonic layer 353B. The primary metal of first plasmonic layer 353A may be the same as the primary metal of second plasmonic layer 353B. In some examples, an atomic percent of first plasmonic layer 353A that includes a primary metal is about the same as an atomic percent of second plasmonic layer 353B that includes the primary metal.

Including a middle layer 353C of a thermally robust metal between first plasmonic layer 353A and second plasmonic layer 353B may, in some instances, reduce or prevent the formation of thermally induced defects in plasmonic disk 353. For example, including a middle layer 353C of a thermally robust primary metal in plasmonic disk 353 may reduce or prevent recession of plasmonic disk 353 away from media-facing surface 305. Reducing or preventing recession of plasmonic disk 353 may, in some examples, enable plasmonic disk 353 to maintain a larger area of contact with near-field emitter 352 over the lifetime of HAMR head 340. A wider area of contact between plasmonic disk 353 and near-field emitter 352 may enable higher efficiency of LSP generation. More efficient LSP generation may reduce the power requirement for operation of HAMR head 340 and, in some instances, may reduce the heat generated during operation of HAMR head 340. A reduction in heat generation may maintain physical integrity of other features of HAMR head 340 (e.g., near-field emitter 352) and may extend the lifetime of HAMR head 340.

Figure 4A:
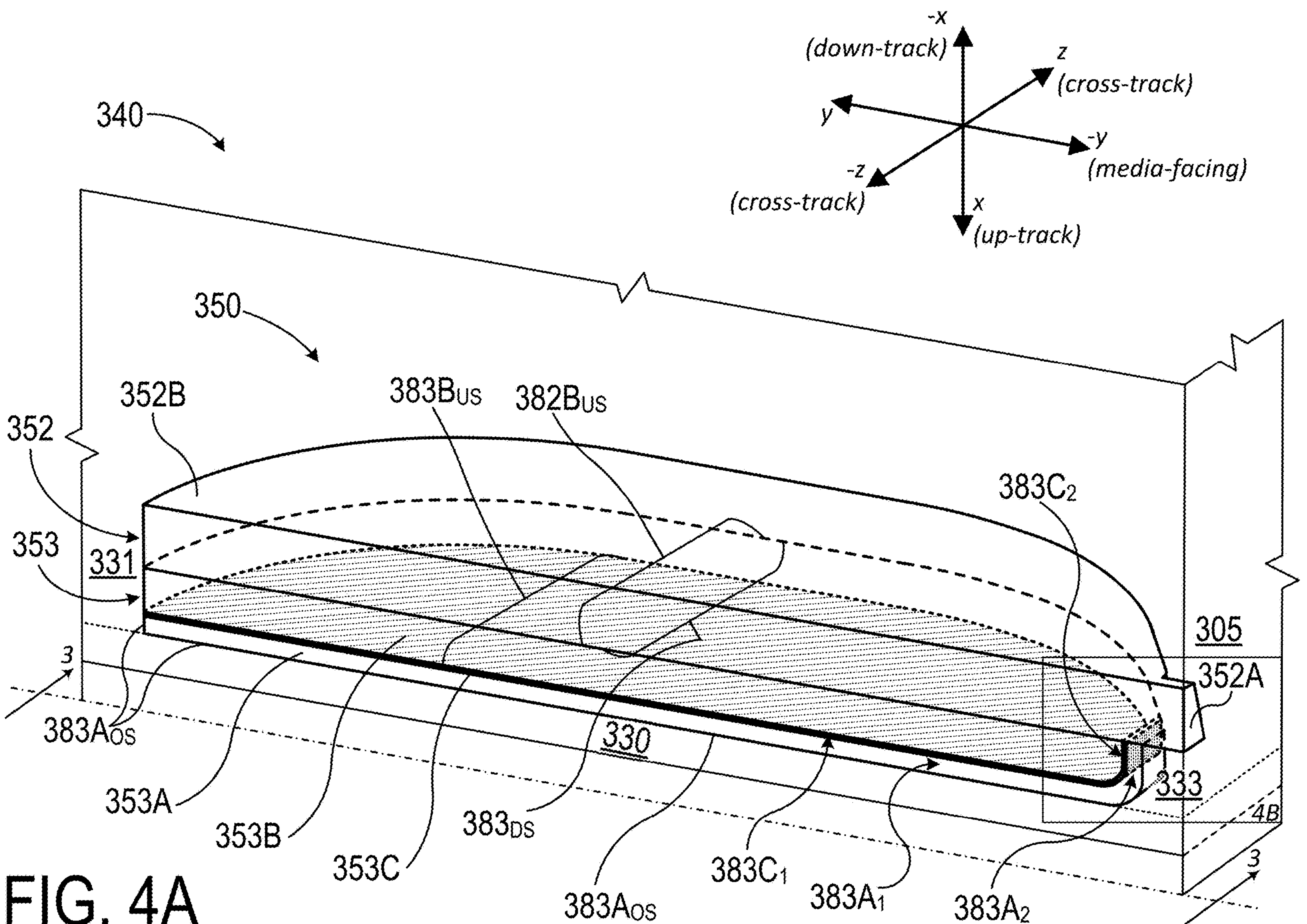
FIG. 4A is a cross-sectional perspective view of an example HAMR head, in accordance with aspects of this disclosure.

FIG. 4A is a cross-sectional perspective view of an example HAMR head, in accordance with aspects of this disclosure. FIG. 4A is a perspective view of HAMR head 340 of FIG. 3, with the view of the section of HAMR head 340 illustrated in FIG. 3 indicated by the line 3-3 of FIG. 4A facing in the direction of the arrows.

HAMR head 340 of FIG. 4A includes a waveguide 330 and an NFT 350. NFT 350 includes a plasmonic disk 353 and a near-field emitter 352. Waveguide is disposed in an up-track direction relative to plasmonic disk 353 and near-field emitter 352. A rear cladding layer 331 may be disposed behind plasmonic disk 353 relative to a media-facing surface 305 of HAMR head 340. A front cladding layer 333 may be disposed proximal to media-facing surface 305 and in front of plasmonic disk 353 relative to media-facing surface 305.

Near-field emitter 352 is disposed in a down-track direction relative to plasmonic disk 353. Near-field emitter 352 includes a peg 352A and an anchor disk 352B. Peg 352A is disposed proximal to media-facing surface 305. Anchor disk 352B is disposed behind peg 352A relative to media-facing surface 305 (e.g., in the +y direction, opposite the−y media-facing direction). Peg 352A may protrude from anchor disk 352B in the vicinity of media-facing surface 305.

Plasmonic disk 353 is disposed in an up-track direction relative to near-field emitter 352. Plasmonic disk 353 includes a first plasmonic layer 353A coupled to waveguide 330, a second plasmonic layer 353B disposed distal to waveguide 330 relative to first plasmonic layer 353A, and a middle layer 353C disposed between first plasmonic layer 353A and second plasmonic layer 353B.

First plasmonic layer 353A includes an outer surface 383$A_{OS}$ that is coupled to waveguide 330. In some examples, outer surface 383$A_{OS}$ is further coupled to rear cladding layer 331. An up-track surface 383$B_{US}$ of second plasmonic layer 353B is disposed along and coupled to middle layer 353C. A down-track surface 383$_{DS}$ of plasmonic disk 353 is coupled to an up-track surface 382$B_{US}$ of anchor disk 352B.

First plasmonic layer 353A includes a first segment 383$A_1$ and a second segment 383$A_2$. First segment 383$A_1$ is coupled to waveguide 330 and may be substantially parallel to waveguide 330. Second segment 383$A_2$ deviates from being substantially parallel to waveguide 330. In some examples, second segment 383$A_2$ is substantially orthogonal to waveguide 330 on a side of plasmonic disk 353 that is opposite waveguide 330. In the example of HAMR head 340, second segment 383$A_2$ is disposed at the front of plasmonic disk 353 relative to media-facing surface 305. In some examples, a contour of second segment 383$A_2$ curves toward media-facing surface 305.

Middle layer 353C includes a first segment 383$C_1$ and a second segment 383$C_2$. First segment 383$C_1$ is substantially parallel to and coupled to first segment 383$A_1$ of first plasmonic layer 353A. Second segment 383$C_2$ is disposed along a contour of second segment 383$A_2$ of first plasmonic layer 353A and is coupled to second segment 383$A_2$ of first plasmonic layer 353A.

Figure 4B:
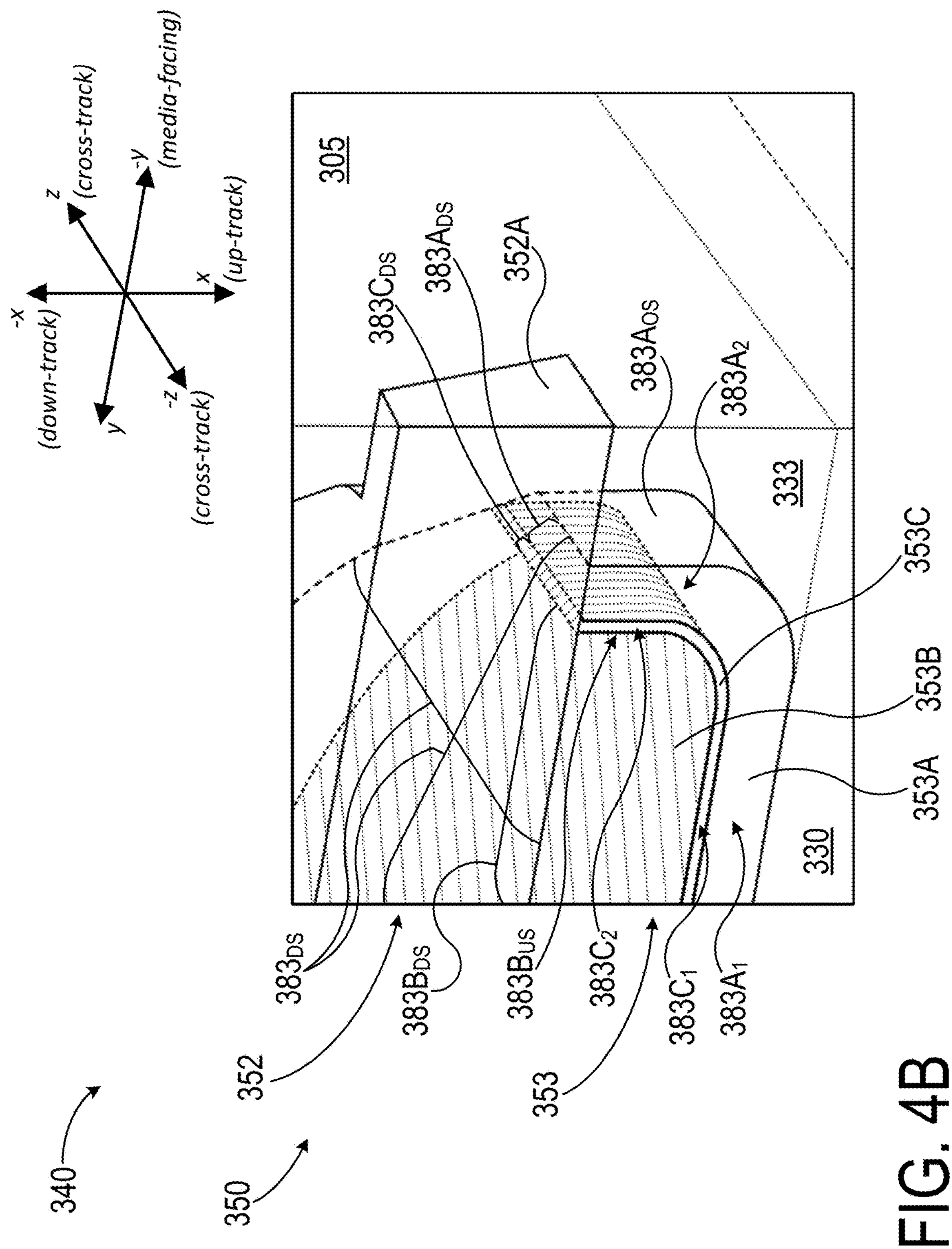
FIG. 4B is a cross-sectional perspective view of an example HAMR head, in accordance with aspects of this disclosure.

FIG. 4B is a cross-sectional perspective view of an example HAMR head, in accordance with aspects of this disclosure. FIG. 4B is an enlarged view of HAMR head 340 of FIG. 4A, with the section of HAMR head 340 illustrated in FIG. 4B indicated by the box marked 4B in FIG. 4A.

HAMR head 340 of FIG. 4B includes a waveguide 330 and an NFT 350. NFT 350 includes a plasmonic disk 353 and a near-field emitter 352. Waveguide 330 is disposed in an up-track direction relative to plasmonic disk 353 and near-field emitter 352. A front cladding layer 333 may be disposed proximal to media-facing surface 305 and in front of plasmonic disk 353 relative to media-facing surface 305. Near-field emitter 352 is disposed in a down-track direction relative to plasmonic disk 353. Near-field emitter 352 includes a peg 352A disposed proximal to a media-facing surface 305.

Plasmonic disk 353 is disposed in an up-track direction relative to near-field emitter 352. Plasmonic disk 353 includes a first plasmonic layer 353A coupled to waveguide 330, a second plasmonic layer 353B disposed distal to waveguide 330 relative to first plasmonic layer 353A, and a middle layer 353C disposed between first plasmonic layer 353A and second plasmonic layer 353B.

First plasmonic layer 353A includes an outer surface 383$A_{OS}$ that is coupled to waveguide 330. In some examples, outer surface 383$A_{OS}$ is further coupled to front cladding layer 333. An up-track surface 383$B_{US}$ of second plasmonic layer 353B is disposed along and coupled to middle layer 353C.

First plasmonic layer 353A includes a first segment 383$A_1$ and a second segment 383$A_2$. Middle layer 353C includes a first segment 383$C_1$ and a second segment 383$C_2$. An up-track surface 383$B_{US}$ of second plasmonic layer 353B is disposed along and coupled to middle layer 353C. Second plasmonic layer 353B further includes a down-track surface 383$B_{US}$ that is opposite second plasmonic layer 353B from and substantially parallel to first segment 383$C_1$ of middle layer 353C. Up-track surface 383$B_{US}$ of second plasmonic layer 353B is coupled to down-track surface 383$B_{DS}$ of second plasmonic layer 353B at a down-track surface 383$_{US}$ of plasmonic disk 353. Down-track surface 383$_{US}$ of plasmonic disk 353 includes down-track surface 383$B_{DS}$ of second plasmonic layer 353B, a down-track surface 383$C_{DS}$ of second segment 383$C_2$ of middle layer 353C, and a down-track surface 383$A_{DS}$ of second segment 383$A_2$ of first plasmonic layer 353A.

Figure 5:
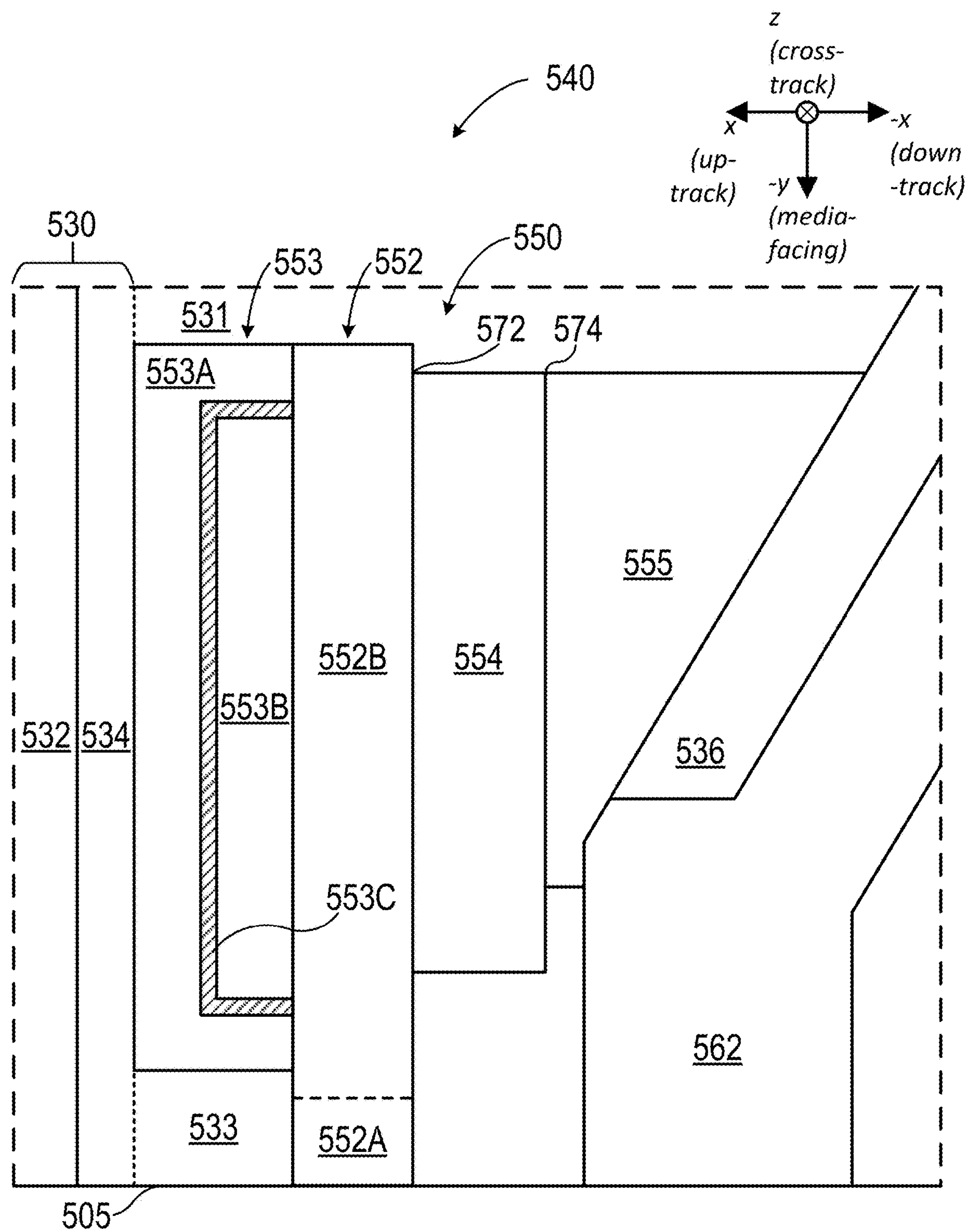
FIG. 5 is a view of an example plasmonic disk of a HAMR head, in accordance with aspects of this disclosure.

FIG. 5 is a cross-sectional view of an example HAMR head, in accordance with aspects of this disclosure. HAMR head 540 includes a waveguide 530, an NFT 550, a write pole 562, a heat sink 555, and a diffuser 536. NFT 550 includes a plasmonic disk 553 and a near-field emitter 552. In the example of FIG. 5, NFT 550 includes a middle disk 554.

Waveguide 530 is disposed in an up-track direction relative to plasmonic disk 553, near-field emitter 552, and middle disk 554. In some examples, waveguide 530 includes multiple optical layers that are configured to support the generation of LSPs. Waveguide 530, for example, may include a waveguide core 532 and a core-to-NFT spacing (CNS) layer 534. CNS layer 534 may be part of a cladding structure that also includes a rear cladding layer 531 and/or a front cladding layer 533. Rear cladding layer 531 is disposed behind plasmonic disk 553 relative to a media-facing surface 505 of HAMR head 540. Front cladding layer 533 is disposed proximal to media-facing surface 505 and in front of plasmonic disk 553 relative to media-facing surface 505.

Near-field emitter 552 is disposed in a down-track direction relative to plasmonic disk 553. Near-field emitter 552 includes a peg 552A and an anchor disk 552B. Peg 552A is disposed proximal to media-facing surface 505. In some instances, one or more portions of peg 552A are exposed on media-facing surface 505. Anchor disk 552B is disposed behind peg 552A relative to media-facing surface 505 (e.g., in the +y direction, opposite the–y media-facing direction). In some examples, near-field emitter 552 is a single, continuous feature comprising peg 552A and anchor disk 552B. That is, peg 552A and anchor disk 552B may be regions or features of a single piece. Near-field emitter 552 may taper or narrow toward peg 552A. Peg 552A may protrude from anchor disk 552B in the vicinity of media-facing surface 505. Peg 552A and anchor disk 552B may share common material(s) (e.g., peg 552A and anchor disk 552B may both include iridium). In some examples, peg 552A and anchor disk 552B include iridium, rhodium, ruthenium, gold alloy(s), gold composite(s) (e.g., a gold-nanoparticle composite), or combinations thereof.

Middle disk 554 is disposed in a down-track direction relative to near-field emitter 552. Middle disk 554 is coupled to anchor disk 552B. In some examples, middle disk 554 and anchor disk 552B are coupled to each other at an interface 572 that is substantially orthogonal to media-facing surface 505. Interface 572 includes a down-track surface of anchor disk 552B coupled to an up-track surface of middle disk 554. In some examples, middle disk 554 includes at least one of gold, iridium, rhodium, copper, tantalum, tungsten, or ruthenium.

Heat sink 555 is disposed in a down-track direction relative to middle disk 554 and is coupled to middle disk 554. In some examples, heat sink 555 and middle disk 554 are coupled to each other at an interface 574 that is substantially orthogonal to media-facing surface 505. Interface 574 includes a down-track surface of middle disk 554 coupled to an up-track surface of heat sink 555. In the example of HAMR head 540, heat sink 555 is coupled to diffuser 536, with diffuser 536 disposed in a down-track direction relative to heat sink 555. Heat sink 555 and/or diffuser 536 may include a thermally conductive material (e.g., gold). In some examples, heat sink 555 includes rhodium, copper, tungsten, tantalum, iridium, platinum, ruthenium, nickel, iron, or combinations thereof.

Plasmonic disk 553 is disposed in an up-track direction relative to near-field emitter 552 and middle disk 554. Plasmonic disk 553 includes a first plasmonic layer 553A, a second plasmonic layer 553B disposed distal to waveguide 530 relative to first plasmonic layer 553A, and a middle layer 553C disposed between first plasmonic layer 553A and second plasmonic layer 553B. First plasmonic layer 553A includes an outer surface that is coupled to waveguide 530. The outer surface of first plasmonic layer may be further coupled to rear cladding layer 531 and/or front cladding layer 533. Plasmonic disk 553 includes a down-track surface that includes a down-track surface of second plasmonic layer 553B, a down-track surface of middle layer 553C, and a down-track surface of first plasmonic layer 553A. The down-track surface of plasmonic disk 553 is coupled to an up-track surface of anchor disk 552B.

Middle layer 553C includes a primary metal. In some examples, the primary metal of middle layer 553C is a thermally robust metal. In some examples, the primary metal constitutes at least 50 atomic percent of middle layer 553C. For example, iridium may constitute at least 50 atomic percent of middle layer 553C. In some examples, the primary metal constitutes at least 90 atomic percent of middle layer 553C. In another example, the primary metal constitutes at least 95 atomic percent of middle layer 553C.

First plasmonic layer 553A and second plasmonic layer 553B each include a plasmonic metal. First plasmonic layer 553A and/or second plasmonic layer 553B may include an alloy and/or a composite of a plasmonic metal (e.g., a gold alloy, a gold/nanoparticle composite). In some examples, the plasmonic metal of first plasmonic layer 553A is a primary metal that is different than the primary metal of middle layer 553C. In one example, the primary metal of first plasmonic layer 553A constitutes at least 90 atomic percent of first plasmonic layer 553A. In some examples, the plasmonic metal of second plasmonic layer 553B is a primary metal that is different than the primary metal of middle layer 553C. In one example, the primary metal of second plasmonic layer 553B constitutes at least 90 atomic percent of second plasmonic layer 553B. The primary metal of first plasmonic layer 553A may be the same as the primary metal of second plasmonic layer 553B. In some examples, an atomic percent of first plasmonic layer 553A that includes a primary metal is about the same as an atomic percent of second plasmonic layer 553B that includes the primary metal.

Figure 6:
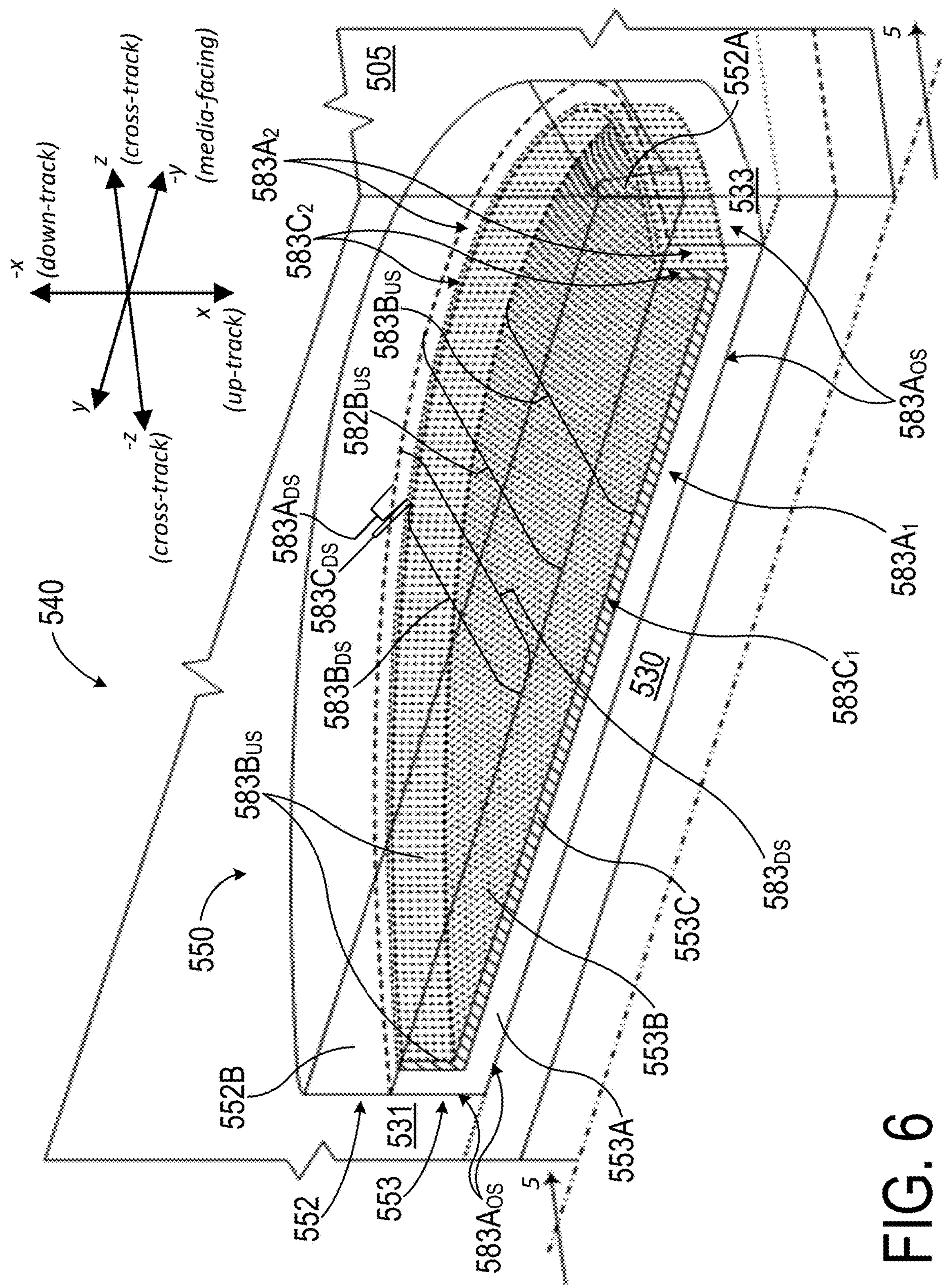
FIG. 6 is a cross-sectional perspective view of an example HAMR head, in accordance with aspects of this disclosure.

FIG. 6 is a cross-sectional perspective view of an example HAMR head, in accordance with aspects of this disclosure. FIG. 6 is a perspective view of HAMR head 540 of FIG. 5, with the view of the section of HAMR head 540 illustrated in FIG. 5 indicated by the line 5-5 of FIG. 6 facing in the direction of the arrows.

HAMR head 540 of FIG. 6 includes a waveguide 530 and an NFT 550. NFT 550 includes a plasmonic disk 553 and a near-field emitter 552. Waveguide is disposed in an up-track direction relative to plasmonic disk 553 and near-field emitter 552. A rear cladding layer 531 may be disposed behind plasmonic disk 553 relative to a media-facing surface 505 of HAMR head 540. A front cladding layer 533 may be disposed proximal to media-facing surface 505 and in front of plasmonic disk 553 relative to media-facing surface 505.

Near-field emitter 552 is disposed in a down-track direction relative to plasmonic disk 553. Near-field emitter 552 includes a peg 552A and an anchor disk 552B. Peg 552A is disposed proximal to media-facing surface 505. Anchor disk 552B is disposed behind peg 552A relative to media-facing surface 505 (e.g., in the +y direction, opposite the−y media-facing direction). Peg 552A may protrude from anchor disk 552B in the vicinity of media-facing surface 505.

Plasmonic disk 553 is disposed in an up-track direction relative to near-field emitter 552. Plasmonic disk 553 includes a first plasmonic layer 553A coupled to waveguide 530, a second plasmonic layer 553B disposed distal to waveguide 530 relative to first plasmonic layer 553A, and a middle layer 553C disposed between first plasmonic layer 553A and second plasmonic layer 553B.

First plasmonic layer 553A includes an outer surface 583$A_{OS}$ that is coupled to waveguide 530. In some examples, outer surface 583$A_{OS}$ is further coupled to front cladding layer 533. In some examples, outer surface 383$A_{OS}$ is further coupled to rear cladding layer 531.

First plasmonic layer 553A includes a first segment 583$A_1$ and a second segment 583$A_2$. First segment 583$A_1$ is coupled to waveguide 530 and may be substantially parallel to waveguide 530. Second segment 583$A_2$ deviates from being substantially parallel to waveguide 530. In some examples, second segment 583$A_2$ is substantially orthogonal to waveguide 530 on a side of plasmonic disk 553 that is opposite waveguide 530. In the example of HAMR head 540, second segment 583$A_2$ is disposed along an outer edge of plasmonic disk 553. The outer edge encloses and defines dimensions of plasmonic disk 553 in a plane that is defined by a media-facing dimension and a cross-track dimension of HAMR head 540.

Middle layer 553C includes a first segment 583$C_1$ and a second segment 583$C_2$. First segment 583$C_1$ is substantially parallel to and coupled to first segment 583$A_1$ of first plasmonic layer 553A. Second segment 583$C_2$ is disposed along a contour of second segment 583$A_2$ of first plasmonic layer 553A and is coupled to second segment 583$A_2$ of first plasmonic layer 553A.

An up-track surface 583$B_{US}$ of second plasmonic layer 553B is disposed along and coupled to middle layer 553C. Second plasmonic layer 553B further includes a down-track surface 583$B_{US}$ that is opposite second plasmonic layer 553B from and substantially parallel to first segment 583$C_1$ of middle layer 553C. Up-track surface 583$B_{US}$ of second plasmonic layer 553B is coupled to down-track surface 583$B_{US}$ of second plasmonic layer 553B at a down-track surface 583$_{US}$ of plasmonic disk 553. Down-track surface 583$_{US}$ of plasmonic disk 553 is coupled to an up-track surface 582$B_{US}$ of anchor disk 552B. Down-track surface 583$_{US}$ of plasmonic disk 553 includes a down-track surface 583$B_{US}$ of second plasmonic layer 553B, a down-track surface 583$C_{DS}$ of second segment 583$C_2$ of middle layer 553C, and a down-track surface 583$A_{DS}$ of second segment 583$A_2$ of first plasmonic layer 553A. A volume of second plasmonic layer 553B is bound by up-track surface 583$B_{US}$ of second plasmonic layer 553B and down-track surface 583$B_{US}$ of second plasmonic layer 553B.

What is claimed is:

1. A heat-assisted magnetic recording head comprising:

a waveguide; and a near-field transducer comprising a plasmonic disk disposed proximal to the waveguide, the plasmonic disk comprising:

a first plasmonic layer coupled to the waveguide;

a second plasmonic layer disposed distal to the waveguide relative to the first plasmonic layer; and a middle layer disposed between the first plasmonic layer and the second plasmonic layer, wherein a primary metal of the first plasmonic layer is different than a primary metal of the middle layer, and wherein a primary metal of the second plasmonic layer is different than the primary metal of the middle layer.

2. The heat-assisted magnetic recording head of claim 1, wherein the primary metal of the middle layer comprises at least one of iridium, rhodium, tantalum, tungsten, or ruthenium.

3. The heat-assisted magnetic recording head of claim 1, wherein the primary metal of the middle layer comprises at least 90 atomic percent of the middle layer.

4. The heat-assisted magnetic recording head of claim 1, wherein the primary metal of the first plasmonic layer comprises a plasmonic metal comprising at least one of gold, silver, ruthenium, copper, aluminum, or rhodium.

5. The heat-assisted magnetic recording head of claim 1, wherein the primary metal of the second plasmonic layer comprises a plasmonic metal comprising at least one of gold, silver, ruthenium, copper, aluminum, or rhodium.

6. The heat-assisted magnetic recording head of claim 1, wherein the primary metal of the first plasmonic layer comprises at least 90 atomic percent of the first plasmonic layer.

7. The heat-assisted magnetic recording head of claim 1, wherein the primary metal of the second plasmonic layer comprises at least 90 atomic percent of the second plasmonic layer.

8. The heat-assisted magnetic recording head of claim 1, wherein the primary metal of the first plasmonic layer is the same as the primary metal of the second plasmonic layer.

9. A heat-assisted magnetic recording head comprising:

a waveguide; and a near-field transducer comprising a plasmonic disk disposed proximal to the waveguide, the plasmonic disk comprising:

a first plasmonic layer coupled to the waveguide;

a second plasmonic layer disposed distal to the waveguide relative to the first plasmonic layer; and a middle layer disposed between the first plasmonic layer and the second plasmonic layer, wherein the first plasmonic layer comprises:

an outer surface that is coupled to the waveguide;

a first segment that is substantially parallel to and coupled to the waveguide; and a second segment that deviates from being substantially parallel to the waveguide.

10. The heat-assisted magnetic recording head of claim 9, wherein the second segment of the first plasmonic layer is substantially orthogonal to the waveguide on a side of the plasmonic disk that is opposite the waveguide.

11. The heat-assisted magnetic recording head of claim 9, wherein the second segment is disposed at the front of the plasmonic disk relative to a media-facing surface of the heat-assisted magnetic recording head, and wherein a contour of the second segment curves toward the media-facing surface.

12. The heat-assisted magnetic recording head of claim 9, wherein the second segment is disposed along an outer edge of the plasmonic disk, and wherein the outer edge encloses and defines dimensions of the plasmonic disk in a plane that is defined by a media-facing dimension and a cross-track dimension of the heat-assisted magnetic recording head.

13. The heat-assisted magnetic recording head of claim 9, wherein the outer surface of the first plasmonic layer is further coupled to a front cladding layer, the front cladding layer disposed proximal to the media-facing surface and in front of the plasmonic disk relative to the media-facing surface.

14. The heat-assisted magnetic recording head of claim 9, wherein the outer surface of the first plasmonic layer is further coupled to a rear cladding layer, the rear cladding layer disposed behind the plasmonic disk relative to the media-facing surface.

15. The heat-assisted magnetic recording head of claim 9, wherein the middle layer comprises:

a first segment that is substantially parallel to and coupled to the first segment of the first plasmonic layer; and a second segment that is disposed along a contour of the second segment of the first plasmonic layer and is coupled to the second segment of the first plasmonic layer.

16. The heat-assisted magnetic recording head of claim 15, wherein an up-track surface of the second plasmonic layer is disposed along and coupled to the middle layer.

17. The heat-assisted magnetic recording head of claim 16, wherein the second plasmonic layer further comprises a down-track surface that is opposite the second plasmonic layer from and substantially parallel to the first segment of the middle layer, and wherein the up-track surface of the second plasmonic layer is coupled to the down-track surface of the second plasmonic layer at a down-track surface of the plasmonic disk.

18. The heat-assisted magnetic recording head of claim 16, wherein a volume of the second plasmonic layer is bound by the up-track surface of the second plasmonic layer and the down-track surface of the second plasmonic layer.

19. The heat-assisted magnetic recording head of claim 15, the near-field transducer further comprising a near-field emitter disposed in a down-track direction relative to the plasmonic disk, the near-field emitter comprising:

a peg configured to produce a hot spot on a proximal magnetic disk, the peg disposed proximal to a media-facing surface of the heat-assisted magnetic recording head; and an anchor disk disposed behind the peg relative to the media-facing surface, wherein a down-track surface of the plasmonic disk is coupled to an up-track surface of the anchor disk, the down-track surface of the plasmonic disk comprising:

a down-track surface of the second plasmonic layer;

a down-track surface of the second segment of the middle layer; and a down-track surface of the second segment of the first plasmonic layer.

* * * * *